United States Patent [19]

Lin

[11] Patent Number: 5,116,202

[45] Date of Patent: May 26, 1992

[54] IMPELLER

[76] Inventor: Yeun-Junn Lin, No. 27-1, 36-6 Lane, Jen Hua Rd., Ta Li Hsiang Taichung Hsien, Taiwan

[21] Appl. No.: 557,008

[22] Filed: Jul. 25, 1990

[51] Int. Cl.⁵ .............................................. F04D 29/34
[52] U.S. Cl. .................................. 416/204 R; 29/889
[58] Field of Search .................... 416/204 R; 29/889

[56] References Cited

U.S. PATENT DOCUMENTS

| 3,604,819 | 9/1971 | Krahe | 416/204 |
|---|---|---|---|
| 4,452,591 | 6/1984 | Fishbaugh et al. | 416/93 A |
| 4,863,353 | 9/1989 | Manninen | 416/204 R |

FOREIGN PATENT DOCUMENTS

| 75999 | 6/1981 | Japan | 29/889 |
|---|---|---|---|
| 2151713 | 6/1985 | United Kingdom | 416/204 |

Primary Examiner—John T. Kwon
Attorney, Agent, or Firm—Fleit, Jacobson, Cohn, Price, Holman & Stern

[57] ABSTRACT

The impeller includes a hollow shaft member screwing therein and thereto a hollow fixing shaft rotatably mounted in nozzle of a motorboat having a propeller shaft projecting into the nozzle to drive the fixing shaft, in which the shaft member has a truncated cone-shaped leading end having a cross-sectionally polygonal inner hole.

2 Claims, 2 Drawing Sheets

IMPELLER

BACKGROUND OF THE INVENTION

The present invention relates to an impeller, and more particularly to one for a motorboat.

A motorboat normally includes a propeller shaft having a transmitting end having a plurality of spaced axial splines, a nozzle rotatably mounting therein a hollow fixing shaft driven by the propeller shaft projecting into the nozzle, and an impeller having a hollow shaft member having a leading end, a trailing end and an inner thread screwing thereto an outer thread of the fixing shaft having a plurality of inner grooves respectively engaging therein the splines. Alternatively, it can be designed that the impeller has the hollow shaft member thereof provided with a plurality of inner grooves capable of respectively engaging therein the splines by the propeller shaft. The present invention deals with the impeller of the first type having an inner thread.

As shown in FIGS. 1 & 2, the prior impeller 10 includes a hollow shaft member 11 having an inner thread 12 and crosssectionally hexagonal leading end 13 suffers from the following disadvantages:

1) Since leading end 13 is crosssectionally hexagonal, it will result in a turbulent flow in the water, and a cavitation on the impeller 10 so that the vibration phenomenon will be incurred on the impeller 10 and the motorboat.

2) Upon disassembling impeller 10 from the motorboat, the housing 15 for nozzle 17 must first be detached from the motorboat in order that a spanner can engage with leading end 13 to screw impeller 10 off hollow fixing shaft 16. In addition, leading end 13 is tapered so that the spanner cannot securely engage with leading end 13 and the engaging surfaces of the spanner and/or leading end 13 may easily get damaged. Thus, the disassembling procedure of impeller 10 is troublesome and relatively uneasy.

SUMMARY OF THE INVENTION

It is therefore an object of the present invention to provide an impeller capable of improving the situation of the turbulent flow resulted thereby and the cavitation occurred thereto.

It is further an object of the present invention to provide an impeller capable of being detached from the hollow fixing shaft without the necessity of first detaching the housing for the nozzle from the motorboat.

According to the present invention, an impeller includes a hollow shaft member having a lead end, a trailing end and an inner thread screwing thereto an outer thread of a hollow fixing shaft rotatably mounted in a nozzle into which a propeller shaft of a motorboat projects to drive the fixing shaft, in which the leading end is truncated cone-shaped and includes a crosssectionally polygonal inner hole.

The present invention may be best understood through the following description with reference to the accompanying drawings, in which:

DETAILED DESCRIPTION OF THE PREFERRED EMBODIMENT

Figure 1:
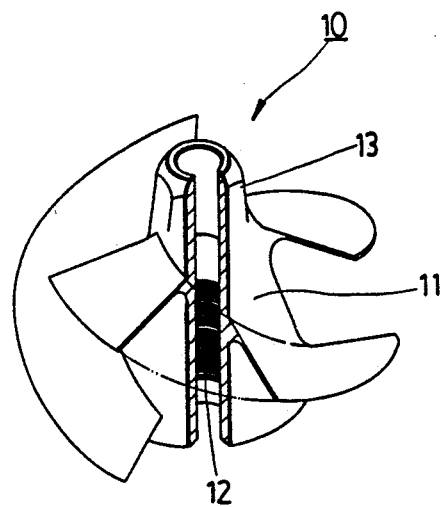
FIG. 1 is a schematically perspective view showing an impeller for a motorboat according to the prior art.
Figure 2:
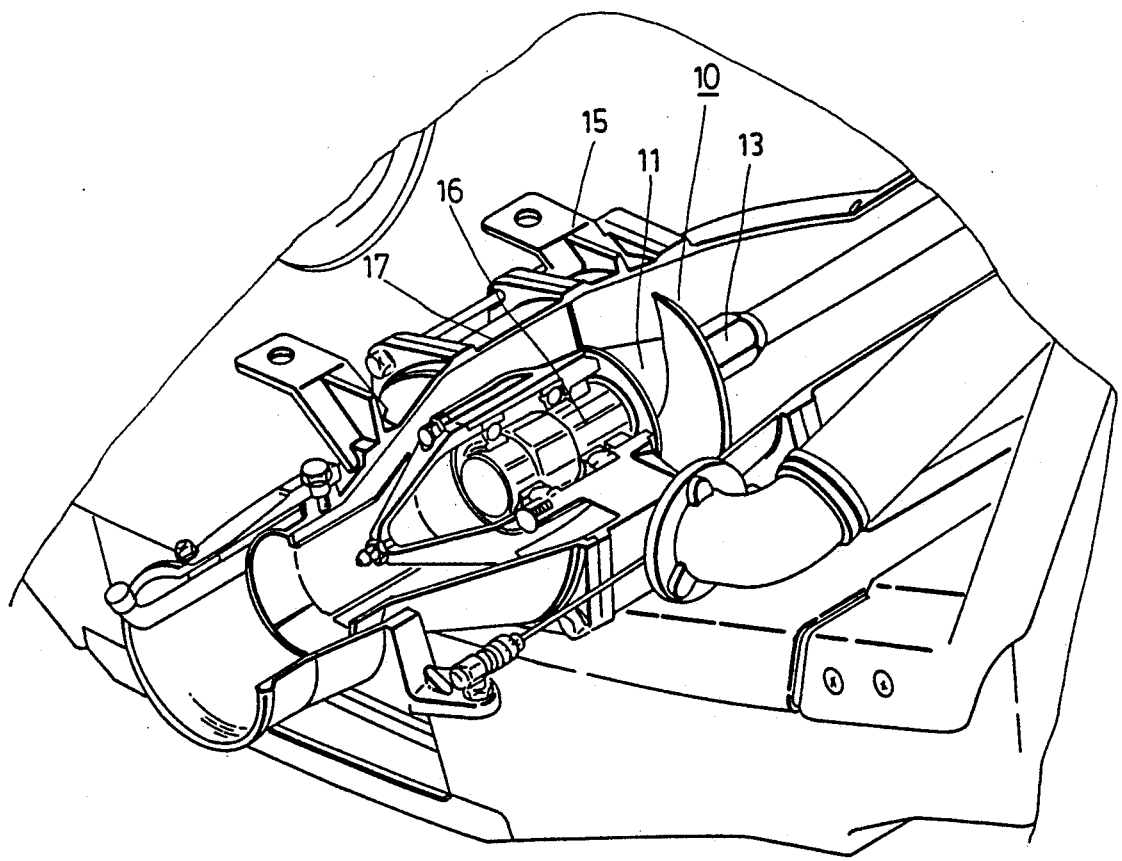
FIG. 2 is a partially fragmentarily perspective view showing a motorboat incorporating thereto an impeller in FIG. 1.
Figure 3:
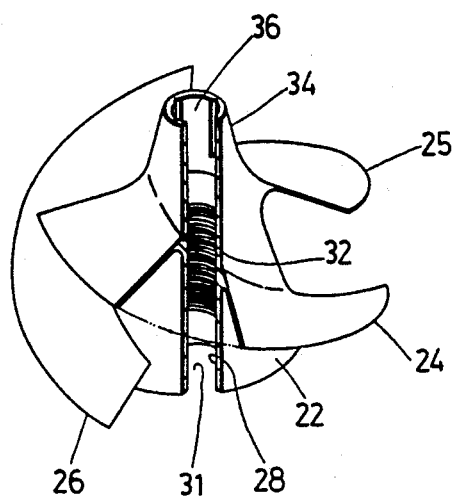
FIG. 3 is a schematically perspective view showing an impeller for a motorboat according to the present invention.
Figure 4:
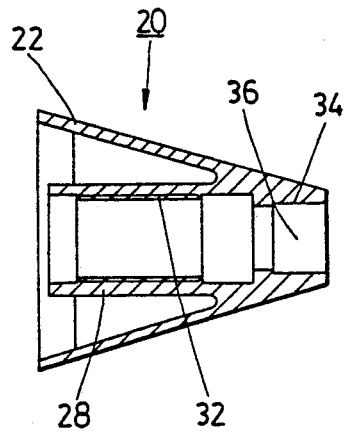
FIG. 4 is an axial sectional view of an impeller in FIG. 3.
Figure 5:
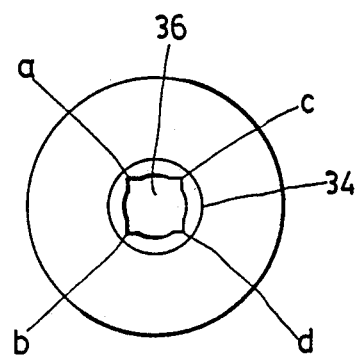
FIG. 5 is an end view of an impeller in FIG. 3.

Referring now to FIGS. 3-5, an impeller 20 according to the present invention includes 3 blades 24, 25, 26 and a hollow shaft member 22 having a truncated cone-shaped leadine end 34 having a crosssectionally polygonal inner hole 36, a trailing end and an inner tube 28 having an inner thread 32 provided on the wall of the axial hole 31 thereof, in which quadrangular inner hole 36 has 4 corners a,b,c,d.

Figure 6:
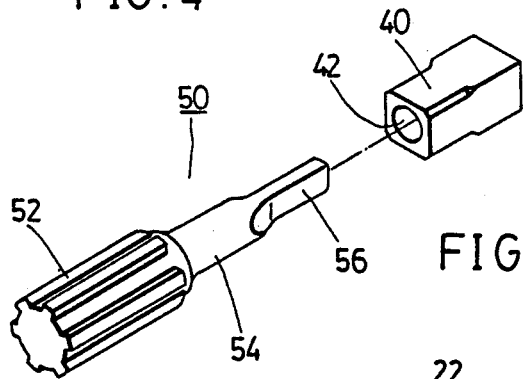
FIG. 6 is a perspective view showing a tool for respectively assembling and disassembling an impeller in FIG. 3 to and from a fixing shaft of a motorboat.
Figure 7:
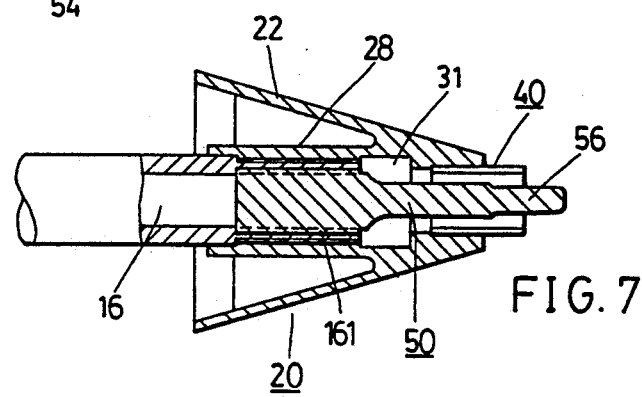
FIG. 7 is a sectional view showing a tool in FIG. 6 in operation.

As shown in FIGS. 6 & 7, upon assembling impeller 20 to the hollow fixing shaft 16, a tool 50 specifically designed for the present impeller 20 is provided. Tool 50 includes an outerly crosssectionally quadrangular insert 40 capable of being matchably inserted in inner hole 36 and having a through hole 42, and a rod member 50 having a first flat end 56 capable of projecting through hole 42, an intermediate portion 54 slidable in hole 42 and a second opposite end spacedly axially providing thereon a plurality of splines 52 respectively engaging with a plurality of grooves 161 of fixing shaft 16 so that rod member 50 and fixing shaft 16 cannot be in relative rotation.

When rod member 50 suitably enagages with fixing shaft 16 and insert 40 is suitably in hole 36, two spanners are respectively engaged with insert 40 and flat end 56 to be respectively revolved in two opposite directions in order that thread 32 screws thereto an outer thread of fixing shaft 16 to assemble impeller 20 on fixing shaft 16. Thereafter, insert 40 and rod member 50 can be removed from hole 36 and fixing shaft 16 respectively to complete the assembling procedure. If impeller 20 is to be disassembled from fixing s haft 16, a procedure similar to the above can be utilized.

Through the above description it should now become readily apparent how and why the present invention can achieve the objects it contemplates.

What I claim is:

1. An impeller adapted to be mounted in a nozzle of a motorboat having a propeller shaft, said impeller having a hollow shaft member having a leading end, a trailing end and an inner thread adapted to screw thereto a hollow fixing shaft rotatably mounted in said nozzle into which said propeller shaft projects to drive said fixing shaft, characterized in that said leading end is truncated cone-shaped and includes a crosssectionally polygonal inner bore further comprising a tool for screwing together said shaft member and said fixing shaft wherein said tool includes:

an outerly crosssectionally polygonal insert having a through hole and capable of being inserted in said leading end; and a rod member having a first flat end capable of projecting through said through hole, and a second opposite end spacedly axially providing thereon a plurality of splines in order that said second end can be inserted into said fixing shaft to engage therewith in manner that said second end and said fixing shaft cannot be in a relative rotation.

2. An impeller according to claim 1 wherein each said recited polygonal inner bore polygonal is quadrangular.

* * * * *